INVENTOR.
CARL V. TILDEN
BY
ATTORNEY

3,377,656
SELF-CONTAINED VACUUM FORMING APPARATUS
Carl V. Tilden, 31176 Ceanothus Drive, Box 591, South Laguna, Calif. 92677
Filed May 23, 1966, Ser. No. 552,180
4 Claims. (Cl. 18—19)

ABSTRACT OF THE DISCLOSURE

A lightweight readily portable self-contained vacuum forming apparatus for use on a bench top. A unitary suction assembly concealed within the open-ended apparatus housing is operable after a plastic preform has been heated to pull the heat-softened plastic against a pattern whereupon the plastic cools and sets. The use of plastic preforms makes it feasible to clamp the plastic directly to the foraminous member supporting the pattern.

---

Figures 1, 2:
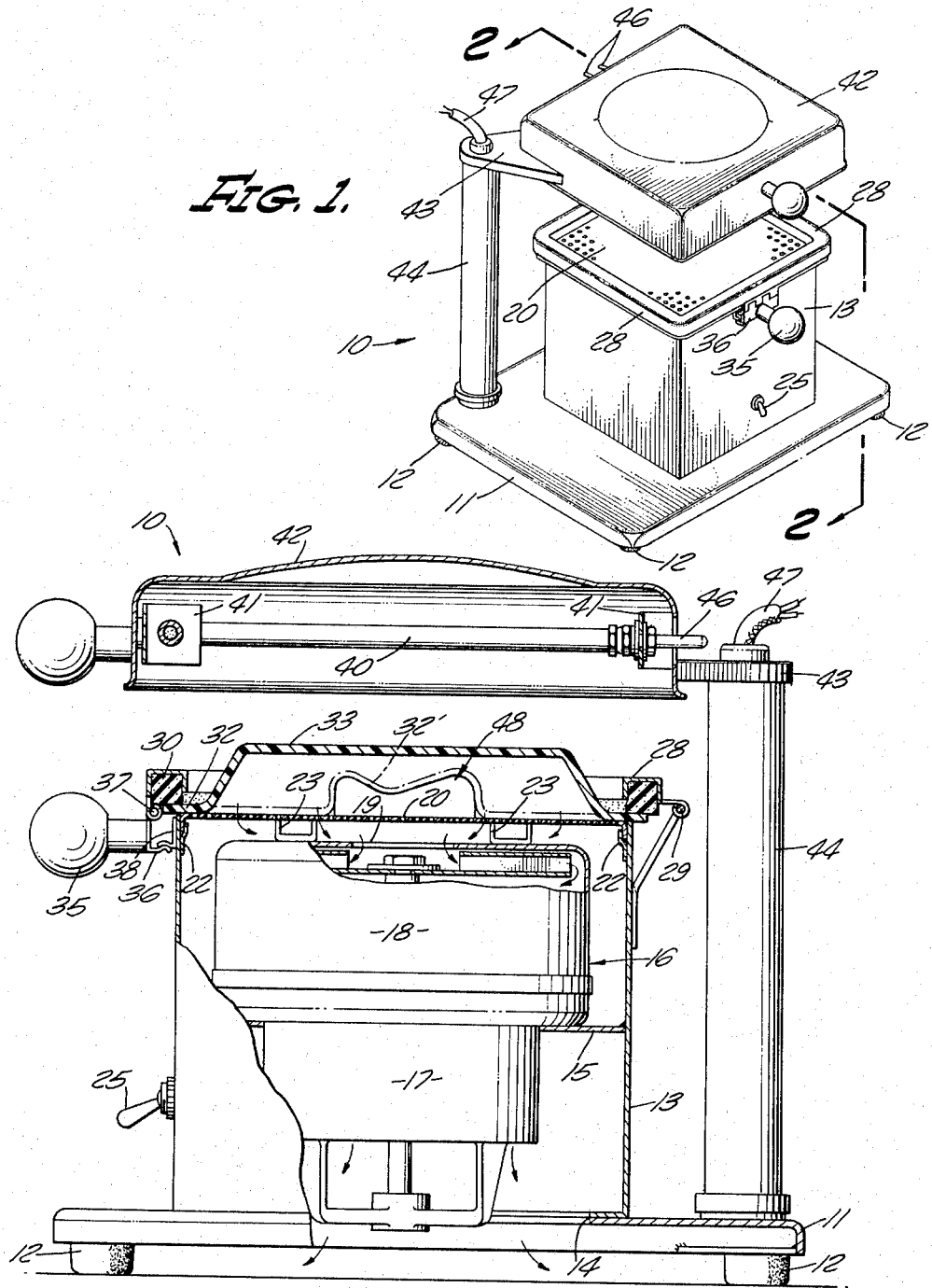

This invention relates to vacuum forming apparatus and more particularly to a compact self-contained portable device adapted to be supported directly on a bench or table top and suitable for use in the laboratory and by technicians in vacuum forming small articles from preformed thermoplastic material.

The apparatus provided by the present invention represents improvements in vacuum forming equipment as heretofore proposed such as that disclosed in my U.S. Letters Patent 3,072,964 granted Jan. 15, 1963. The present apparatus is considerably simpler to operate, is more compact and more economical to construct and use. More specifically, the present apparatus comprises a simple housing serving not only to support the mold or pattern, the plastic sheeting and the heater but also to enclose a motorized suction unit effective to create the pressure differential employed to draw the heat-softened plastic into conformity with the pattern. Formerly, the suction unit has been located separately from the molding equipment proper and requires connections to the molding equipment along with appropriate control valves. Furthermore, the operation of prior equipment involves a number of steps requiring considerable experience and know-how on the part of the operator.

There is provided by the present invention a simple, compact device which is completely self-contained and which can be used by relatively inexperienced operators to provide results of high reliability and uniformity. The power driven suction unit is housed directly within the main housing which serves additionally as a support for the pattern. Avoided is the need for means to suupport the plastic sheeting while undergoing softening and then moving it into the presence of the pattern. Instead, the present invention utilizes simple preforms of thermoplastic the rims of which are clamped rigidly in place directly against the support for the pattern. Consequently, it is merely necessary for the operator to insert the preform, close the clamp, operate the heater and then energize the suction means.

Accordingly, it is a primary object of the present invention to provide an improved self-contained portable vacuum molding apparatus of simplified construction.

Another object of the invention is the provision of vacuum molding apparatus designed to utilize plastic preforms together with means for clamping the rims of the preforms directly against the pattern supporting surface.

Another object of the invention is the provision of a unitary readily portable vacuum forming device having need for merely electrical connections to a power outlet and readily usable by inexperienced operators to produce accurate and precision molded parts.

These and other more specific objects will appear upon reading the following specification and claims and upon considering in connection therewith the attached drawing to which they relate.

Referring now to the drawing in which a preferred embodiment of the invention is illustrated.

FIGURE 1 is a perspective view of one preferred embodiment of the invention; and FIGURE 2 is a cross-sectional view taken along line 2—2 and showing constructional details of the equipment while in use.

Referring to FIGURES 1 and 2, there is shown one preferred embodiment of the invention designated generally 10. This apparatus includes a base 11 mounted on feet 12 and supporting centrally thereof a tubular housing 13 secured in any suitable manner about the rim of an opening 14 through the base. Secured crosswise of the midportion of housing 13 is a partition ring 15 in which is nested a motor fan assembly 16. This assembly comprises an electric driving motor 17 secured for a multistage suction fan 18 having its suction inlet 19 positioned below a foraminous plate 20. The latter has a downturned rim nested within supporting clips 22 secured to the interior of housing 13. Member 20 rests by gravity within these clips and includes spacer members 23 secured to its central area and bearing against the top of the suction fan housing. The air enters inlet 19, passes through the several stages of the fan, and discharges axially through motor 17 and against the table top through outlet opening 14 in the base of the molding apparatus. Operation of the motor fan unit is controlled by a switch 25 conveniently mounted in the side wall of the housing.

Overlying the upper end of housing 13 is a rigid frame or ring 28 movably connected to the housing crosswise of one edge by a hinge 29. Frame 28 is provided with a downwardly facing channel seating a thick resilient gasket ring 30 adapted to be pressed against the rim edge 32 of a thermoplastic preform 33. The combined handle and clamp for the frame includes a knob 35 secured to a clamp 36 hinged to the frame at 37. Clamp 36 seats resiliently within a detent member 38 secured to the side of housing 13, the frame being shown in clamped position in FIGURE 2.

Means for heating and softening plastic preform 33 comprises an electric heater suitably supported in mounting brackets 41 secured about the interior rim of a hood 42. Projecting laterally from one corner of this hood is a mounting bracket 43 secured to a shank, not shown, journaled within the upper end of an upright tubular column 44 suitably secured to base 11. The heater element is provided with terminal posts 46 extending through an opening in the rim of hood 42 and adapted to be connected to the socket of a conventional electrical service cord. Other service wires 47 extend through column 44 to motor switch 25.

In the use of the apparatus, let it be assumed that it is desired to make a molded part using part of mold 48 for dentures. This pattern is placed centrally of foraminous member 20. A plastic preform 33 is then clamped in position by first swiveling heater hood 42 laterally to one side of housing 13 and opening frame 28 upwardly about hinge 29. After the preform has been placed against the rim of the foraminous member, frame 28 is latched in closed position as is shown in FIGURE 2.

Thereafter, the service cord for heater 40 is connected and the heater is swiveled back to the position shown in FIGURE 1. The operator observes the preform and notes when it has been heated sufficiently to soften and settle toward pattern 48. The heater hood can then be swung to one side as motor switch 25 is closed to activate suction unit 16. The powerful suction produced by this unit creates a high pressure differential across the softened plastic preform with the result that the preform is almost instantly pulled into precise conformity with the exterior surfaces of pattern 48 the final configuration of the plastic being as indicated by dotted line 33'. The motor may now be de-energized and frame 28 opened to release the finished molded part. The next part is molded in the same manner using the same or a different pattern.

At any time it is desired to gain access to the motor fan unit for servicing it is merely necessary to lift foraminous member 20 by inserting a pointed tool through one of its openings. The motor fan unit is then fully exposed and may be withdrawn upwardly from its supporting partition ring 15 if there is need.

While the particular self-contained vacuum forming apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A self-contained readily portable vacuum forming apparatus adapted to be carried under the arm of the user and supported on a bench top or the like when in use, said apparatus having a base provided with feet engageable with a bench top to support the base sufficiently thereabove to accommodate air flow outwardly across the bench, a low-height open-ended tubular housing upstanding from said base and opening downwardly therethrough, a unitary motor-driven suction assembly concealed within and extending axially of said tubular housing having a single vertical shaft extending axially of said housing, said suction unit having an air inlet closely beneath the upper open end of said tubular housing and an air outlet opening downwardly and discharging air through said base for escape across the bench top, a foraminous member mounted across the open upper end of said housing for supporting a positive pattern, frame means movably supported at the upper end of said housing for clamping the rim of a plastic preform immovably to the rim of said foraminous member, and electric heat means for heating a plastic preform clamped across the upper end of said housing and including means for pivoting said heater means between a heating position directly above a clamped preform and a non-heating position to one side of said housing.

2. Vacuum forming apparatus as defined in claim 1 characterized in that said motor-driven suction assembly is mounted in partition means extending crosswise of said housing between the upper and lower ends thereof, said suction assembly having a suction fan above said partition means and a driving motor therefor beneath said partition means and the air discharging from said suction fan flowing through said driving motor to cool the same.

3. Vacuum forming apparatus as defined in claim 1 characterized in that said foraminous means is held in assembled position by gravity action and includes spacer means interposed between the midportion thereof and the upper end of said motor-driven suction assembly.

4. Vacuum forming apparatus as defined in claim 1 characterized in that said heater means is supported for pivotable movement in a horizontal plane from a position overlying the upper end of said housing to an inactive position lateral to one side of said housing.

References Cited

UNITED STATES PATENTS

| 2,765,493 | 10/1956 | Winstead | 18—19 |
| 2,836,852 | 6/1958 | Butzko | 18—19 |
| 2,993,232 | 7/1961 | Van Hartesveldt | 18—19 |
| 3,113,345 | 12/1963 | Butzko | 18—19 |
| 3,307,222 | 3/1967 | Baldwin et al. | 18—19 |

FOREIGN PATENTS 83,530  9/1957  Denmark.

WILLIAM J. STEPHENSON, *Primary Examiner.*